United States Patent [19]

Sugiura et al.

[11] Patent Number: 4,600,437
[45] Date of Patent: Jul. 15, 1986

[54] INORGANIC MATERIAL, A PROCESS FOR PRODUCING SAME AND A SOLIDIFYING METHOD THEREOF

[75] Inventors: Masahiro Sugiura; Yoshiaki Fukushima; Hiroaki Hayashi; Mitsumasa Horii; Takako Kurimoto; Kazuhiro Fukumoto, all of Aichi, Japan

[73] Assignee: Kabushiki Kaisha Toyota Chuo Kenkyusho, Nagakute, Japan

[21] Appl. No.: 716,144

[22] Filed: Mar. 26, 1985

[30] Foreign Application Priority Data

Mar. 29, 1984 [JP] Japan .................. 59-62566
Mar. 30, 1984 [JP] Japan .................. 59-63479

[51] Int. Cl.$^4$ ............................................. C09D 1/02
[52] U.S. Cl. ............................. 106/74; 106/84; 106/38.3
[58] Field of Search ................. 106/74, 84, 38.3; 252/62

[56] References Cited

U.S. PATENT DOCUMENTS

| | | | |
|---|---|---|---|
| 3,203,813 | 8/1965 | Gajardo et al. | 252/62 |
| 3,419,495 | 12/1968 | Weldes et al. | 106/84 |
| 3,830,173 | 8/1974 | Hubble et al. | 106/84 |
| 4,066,463 | 1/1978 | Chollet | 106/74 |
| 4,446,040 | 5/1984 | Samanta | 252/62 |

FOREIGN PATENT DOCUMENTS 3229339  2/1984  Fed. Rep. of Germany ........ 106/84

Primary Examiner—William R. Dixon, Jr.
Assistant Examiner—Steven Capella
Attorney, Agent, or Firm—Oblon, Fisher, Spivak, McClelland & Maier

[57] ABSTRACT

Inorganic material comprises a mixture of water glass and metakaolin obtained by heat treating a kaolin group clay mineral at 600° to 900° C. This inorganic material, when solidified by drying, exhibits excellent water resistance, and when solidified by heating to a temperature of 80° to 500° C., exhibits excellent water and hot water resistances. The inorganic material may further contain a hydrous magnesium silicate type clay mineral. Such material, when solidified by drying, exhibits further excellent water resistance and when solidified by heating to a temperature of 80° to 500° C., exhibits excellent resistances to water, hot water and boiling water.

13 Claims, 2 Drawing Figures ic Material, a Process for Producing Same and a Solidifying Method Thereof

BACKGROUND OF THE INVENTION

1. Field of the Invention

This invention relates to an inorganic material which comprises water glass and metakaolin, or water glass, metakaolin and a hydrous magnesium silicate type clay mineral, which has good workability and excellent water and hot water resistances when solidified, and also relates to a process for producing same and a solidifying method thereof.

2. Description of the Prior Art

One of materials enjoying wide ranges of industrial applications is water glass. In general, water glass is a colorless, highly viscous, concentrated aqueous solution of an alkali salt of silicic acid obtained by melting silicon dioxide and an alkali. When said water glass is left in air, the water content evaporates and it solidifies. Thus, by utilizing such properties, water glass is widely employed as adhesives for artificial stone, pottery, boxboard, etc., also as coating materials, soil improvers, molding materials, etc.

However, said water glass, even when once solidified, again absorbs water upon contact with water and returns to a viscous liquid. Therefore, it is impossible to use said water glass in highly humid places such as the outdoors, or where it is directly contacted with water. In other words, the solidified product of said water glass has a disadvantage that it has no water resistance.

Heretofore, many attempts have been made to impart water resistance to the solidified product of said water glass and one of these methods is to add a phosphoric acid based hardening agent of heat condensation type, or cement, or zinc oxide, etc. prior to solidifying, thereby to render water glass insoluble. However, these compositions still have a disadvantage that they gradually dissolve when left outdoors for a prolonged time or dipped in hot water or boiling water, although they have water resistance to some degree in water at normal temperature.

SUMMARY OF THE INVENTION

Accordingly, it is an object of this invention to provide inorganic material having good workability in molding, coating, etc., a process for producing such material and a solidifying method thereof.

It is another object of this invention to provide inorganic material which is insoluble, when solidified, to not only water at normal temperature, but also to hot water or boiling water even when dipped therein for a prolonged time, and its producing and solidifying methods.

Other objects, features and advantages of the invention will become apparent from the following description in which preferred embodiments are described.

Inorganic material according to the present invention comprises a mixture of water glass and metakaolin obtained by heat treating a kaolin group clay mineral at 600° to 900° C. This material, when solidified by drying, does not dissolve even when dipped in water for a prolonged time and thus has excellent water resistance. Further, this material, when solidified by heating to a temperature of 80° to 500° C., exhibits water and hot water resistances.

Inorganic material of this invention may further include a hydrous magnesium silicate type clay mineral. Such material when solidified by drying exhibits further excellent water resistance, and when solidified by heating to a temperature of 80° to 500° C. excellent resistances to water, hot water and boiling water.

A process for producing inorganic material according to the present invention comprises heat treating a kaolin group clay mineral in a manner to modify the same to metakaolin and mixing the metakaolin and water glass, or the metakaolin, water glass and a hydrous magnesium silicate type clay mineral.

In the heat treating step of this process, organic substances contained in the kaolin group clay mineral are removed and at the same time hydrophilic groups, i.e. hydroxyl groups contained in the kaoling group clay mineral disappear to modify it to metakaolin, thereby enhancing the reactivity of the water glass and metakaolin powder, or the water glass, the hydrous magnesium silicate type clay mineral and the metakaolin power. Inorganic material thus obtained exhibits excellent properties when solidified.

A method of solidifying inorganic material according to the present invention comprises heat treating a kaolin group clay mineral in a manner to modify the same to metakaolin, mixing the metakaolin and water glass, or the metakaolin, water glass and a hydrous magnesium silicate type clay mineral, to produce inorganic material, and heating the inorganic material to a temperature of 80° to 500° C. for solidifying the same.

When the water glass and metakaolin are used, the reaction therebetween proceeds satisfactorily because the inorganic material is solidified under high temperature conditions, and the obtained solidified product has superior water and hot water resistances to that solidified at normal temperature.

When the water glass, metakaolin and hydrous magnesium silicate type clay mineral are used, $Na^+$ ions of the water glass react with the metakaolin and the hydrous magnesium silicate type clay mineral respectively and at the same time the metakaolin and hydrous magnesium silicate type clay mineral synergistically react in the presence of the highly alkaline water glass to further fix the $Na^+$ ions and/or reinforce Si—O chains, and thus the obtained solidified product has further superior water resistance, hot water resistance and boiling water resistance to that solidified at normal temperature.

Moreover, where such is coated and solidified on a base of a metal or an inorganic substance, as an adhesive, said solidified product manifests stronger adhesivity than that solidified at normal temperature. Furthermore, where coated and heated to solidify, the surface of said inorganic material exhibits a remarkably hydrophobic nature.

BRIEF DESCRIPTION OF THE DRAWINGS

The drawings show examples of this invention; wherein.

DETAILED DESCRIPTION OF THE INVENTION

Figure 1:
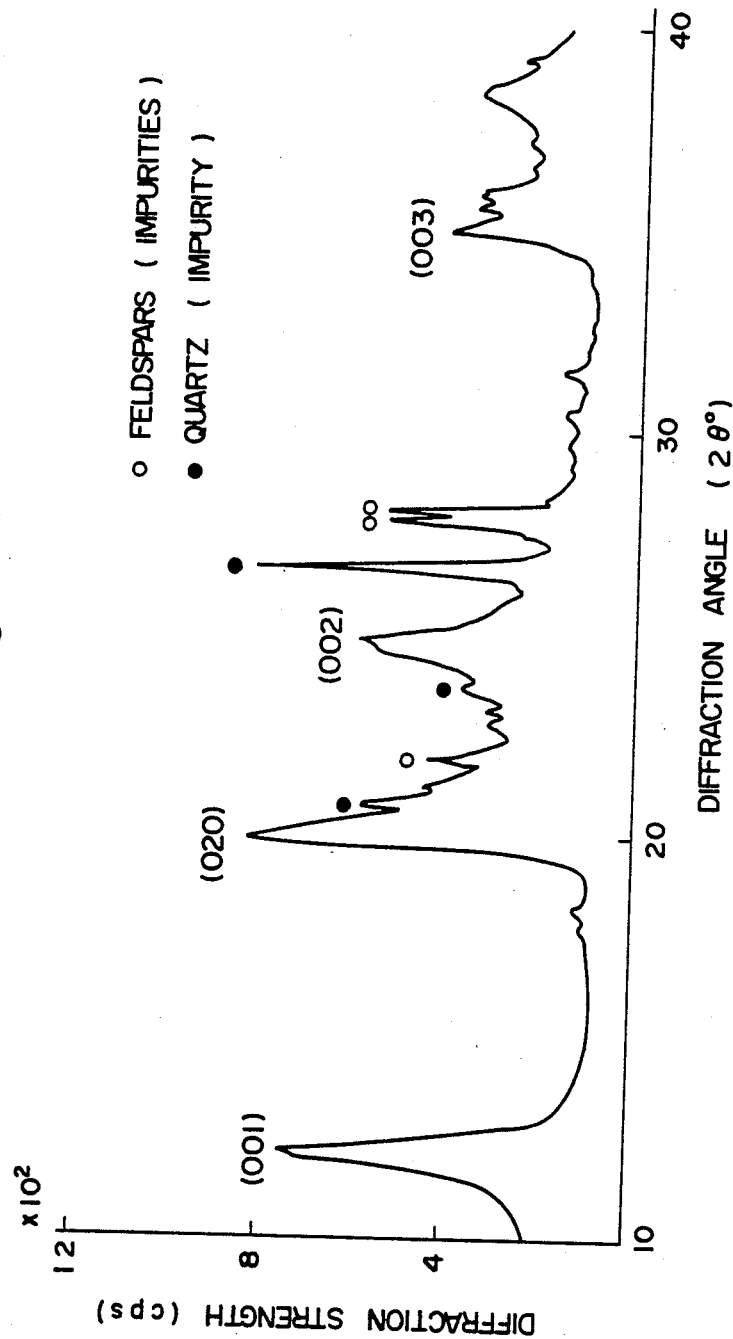
FIG. 1 is a graph showing an X-ray diffraction strength curve of kaolin used in the examples of this invention.

The water glass in this invention is generally a 10–70% by weight (wt %) aqueous solution of an alkali salt of silicic acid. While said alkali salt of silicic acid is most commonly that represented by $Na_2O.nSiO_2$ (wherein $n=1-4$), this $Na_2O$ may be replaced by $K_2O$, $Li_2O$ or $(NH_4)_2O$. Further, this may also be water glass No. 1-3 as designated by the Japanese Industrial Standards (JIS), commercially available as water glass.

The kaolin group clay mineral in this invention has a composition that the main component of said mineral is $Al_2Si_2O_5(OH)_4.nH_2O$ (wherein $nH_2O$ is interlayer water and $n=0$ or an integer of 1 or more). More specifically, as substances wherein $n=0$, there are kaolinite, dickite, nacrite, metahalloysite, etc.; and as substances wherein $n=1$ or more, i.e., having interlayer water, there are halloysite, etc.

The shape of said kaolin group clay mineral is not constant, and, for example, kaolinite, dickite and nacrite are hexagonal plates, whereas metahalloysite and halloysite are tubular, cylindrical or spherical.

Said kaolin group clay mineral is generally called by its common name "kaolin", and it is usually called by putting the name of the place of origin before the "kaolin", such as Korea kaolin, Georgia kaolin, New Zealand kaolin, Kongo kaolin, Ina kaolin, etc.

The metakaolin in this invention is an amorphous substance produced when the aforesaid kaolin group clay mineral is modified by heating, which possesses a nature that it no longer returns to the original mineral even when it absorbs or adsorbs a great amount of water but still retains the structure of said mineral.

The inorganic material of this invention is a mixture of the aforesaid water glass and metakaolin.

Further, preferably, it is a mixture of water glass, metakaolin and a hydrous magnesium silicate type clay mineral.

As herein used, the hydrous magnesium silicate type clay mineral (hereinafter referred to as said clay mineral) is a clay mineral mainly comprising hydrous magnesium silicate and containing hydroxyl groups rich in reactivity on the surface. Said clay mineral is composed of fibers of about 0.005-0.6 $\mu m$ in diameter, in which channels having a rectangular cross-section of about $10 \times 6$ Å or $6 \times 6$ Å parallel to said fibers are present, and it has itself properties of absorbing and releasing atmospheric moisture and absorbing odorous gaseous matters in air. Further, said clay mineral may sometimes be such that a part of the magnesium is replaced by aluminum, iron, sodium, nickel, etc.

Specific examples thereof are hydrous magnesium silicate-based substances such as sepiolite, xylotile, loughlinite, falcondoite, etc., and hydrous magnesium aluminum silicate-based substances such as palygorskite, etc., and they are used either alone or as a mixture of two or more thereof.

Further, minerals called by such common names as mountain cork, mountain wood, mountain leather, meers-chaum, attapulgite, etc. fall in this category.

Said clay mineral is preferably used in a form ground to such degree that the channels possessed by said clay mineral are still retained, although it can be used in any of a powder, a granular or a plate form, and its size is preferably in the range of 0.1 $\mu m$-5 mm in order to obtain a uniform inorganic material. Grinding on this occasion is conducted by wet or dry grinding using a mixer, a ball mill, an oscillating mill, a pin mill, a beater, etc.

The process for the production of an inorganic material of this invention comprises a heat treating step of heating a kaolin group clay mineral to modify it to metakaolin and a mixing step of mixing said metakaolin and water glass, and, if necessary, a hydrous magnesium silicate type clay mineral to produce an inorganic material.

In the above process, the heat treating step is a step of heating the kaolin group clay mineral for a certain period of time to obtain metakaolin in this invention. The temperature for heat treating the kaolin group clay mineral is preferably in the temperature range of 600°-900° C. By heating in this temperature range, dehydration takes place to modify it to metakolin. If said heating temperature exceeds 900° C., said metakaolin crystallizes again and changes into other substance, whereas if it is less than 600° C., it is not modified to metakaolin, and therefore, either is not preferred.

The aforesaid heat treating time varies depending on the heat treating temperature, but is in general from several minutes to about 5 or 6 hours. The higher the heat treating temperature, the shorter the heat treating time may be. The atmosphere of this heat treatment is preferably air or an inert gas. Of those, it is more preferred to conduct it in air.

Further, on mixing starting materials for the inorganic material, the size of the metakaolin used is preferably in the range of 0.1 mm-5 mm. It is because a more uniform inorganic material may be obtained by using a powder of this size. Therefore, in order to reduce the metakaolin to said size, it is preferred to firstly grind a kaolin group clay mineral to said size and subsequently heat treat to make metakolin, or to grind a heat treated metakaolin to said size.

The aforesaid mixing step may be effected by using the conventional mixer, ball mill, oscillating mill, mortar, etc.

Further, the mixing proportion of the aforesaid metakaolin and water glass is preferably such that the metakaolin on the dry weight basis is 12.5-200 g per 100 g of the solid content of the water glass. This is because if the mixing proportion of the metakaolin is smaller than the above range, said inorganic material does not possess water resistance even after solidification, and moreover generates cracks on drying-solidification. Further, where its content exceeds the above range, not only the mixing step cannot be easily effected but also the workability is deteriorated when the obtained inorganic material is molded and coated. Furthermore, it is also because cracks are easily formed on drying-solidification, and enough strength cannot be obtained after solidification. Moreover, it is also because, where coated on a substrate, the adhesivity to the substrate is poor. In order to adjust the viscosity of the inorganic material, it is also possible to add an appropriate amount of water.

Further, where the water glass, the hydrous magnesium silicate type clay mineral and the metakaolin are mixed to produce the inorganic material, the amount of the hydrous magnesium silicate clay mineral mixed is preferably 12.5-200 g on the dry weight basis per 100 g of the solid content of the water glass.

The method of solidifying the inorganic material is described below. First, said inorganic material is molded into a predetermined shape depending on its use, or injection molded in a mold, or coated and solidified as a film on a surface of a substrate composed of boxboard, wood, metal, ceramics, etc. to produce a molded product. Further, it is possible to use it as a bonding material for substrates by bonding two or more substrates, or by making gaps and injecting it therein.

The aforesaid solidification may be preferably achieved by heating said inorganic material to a temperature of 80°–500° C., although it can also be achieved by air drying at room temperature or in its vicinity for a polonged time. During the temperaturerise period of this heating step, that having a larger mixing proportion of the metakaolin in the constituting composition for said inorganic material does not expand even when the heating temperature is 180°–500° C., and thus it is useful as a paint for various materials. Further, that having a smaller proportion of the metakaolin expands at a heating temperature of 180°–500° C., and thus it may be used as an expanded material, and further since it has an advantage that it does not expand at a heating temperature of 80° C. or higher but less than 180° C., it is useful. In the case of this temperature range, it is preferred to make the mixing proportion of the metakaolin large. This is because where the mixing proportion is large, the water resistance of the inorganic material is more excellent. Further, that dried and solidified at room temperature or in its vicinity may also be heated and maintained at a temperature in the aforesaid temperature range.

By providing this heating step, said inorganic material possesses even more excellent water resistance and hot water resistance than the case of normal temperature solidification or than a solidified product of an inorganic material composed of a mixture of a non-heat-treated kaolin group clay mineral and water glass. This is believed due to that by providing the heating step, not only the amorphous substance metakaolin becomes rich in reactivity and fixes alkali metal ions of the water glass but also Si—O chains of the amorphous moiety of the metakaolin is cut by the alkali and combines with Si—O chains of the solid content of the water glass, whereby the Si—O chains become stronger.

Further, even where the temperature is raised by heating after solidification at normal temperature, more excellent water resistance and hot water resistance are imparted as compared with that not subjected to this heating.

Furthermore, where the heating step is imparted to an inorganic material containing a hydrous magnesium silicate type clay material, that having a lower mixing proportions of the hydrous magnesium silicate clay mineral and the metakaolin in the constituting components of the inorganic material expands at a heating temperature of 180°–500° C. to give an expanded material excellent in water resistance. Further, that in which the mixing proportion of at least either of the hydrous magnesium silicate type clay mineral and the metakaolin is made large does not expand even at a heating temperature of 180°–500° C., and thus gives a non-expanded material excellent in water resistance and useful as a paint for various materials. In addition, it has an advantage that it does not expand at a heating temperature of 80° C. or higher but less than 180° C., and thus is useful. Furthermore, that dried and solidified at a temperature in the vicinity of normal temperature may be heated and maintained at a temperature in the aforesaid temperature range.

By providing this heating step, said inorganic material possesses even further excellent water resistance, hot water resistance and further boiling water resistance than in the case of solidification at normal temperature or than a solidified product of an inorganic material composed of a mixture of a kaolin group clay mineral not subjected to the heat treatment, water glass and a hydrous magnesium silicate type clay mineral. This is believed due to that by providing this heating step, with said inorganic material, not only $Na^+$ ions of the water glass react with the hydrous magnesium silicate type clay mineral but also the amorphous substance metakaoline and the hydrous magnesium silicate type clay mineral synergistically act on each other in the presence of the highly alkaline water glass and become rich in reactivity, thereby fixing and reinforcing the alkali metal of the water glass.

Further, even where the temperature is raised by heating after solidification at normal temperature, more excellent water resistance, hot water resistance and boiling water resistance are obtained as compared with the case where the temperature is not raised at all.

In this invention, in addition to the water glass, the metakaolin and the optional hydrous magnesium silicate type clay mineral, it is possible to appropriately add, as fillers, etc., additives which do not adversely influence the various properties of the water glass. As said additives, for example, such inorganic substances as silica, vermiculite, glass powder, glass fiber, fly ash, etc. may be employed. By adding these additives, in addition to the function as fillers, the degree of shrinkage of said inorganic material on heating is reduced, whereby it is possible to prevent the generation of cracks.

DESCRIPTION OF THE PREFERRED EMBODIMENTS

This invention is more particularly described by the following examples.

EXAMPLE 1

Korea kaolin (containing $SiO_2$: 47.3, $Al_2O$: 32.8; the unit being wt % throughout the specification) was ground in a ball mill to give particles of a particle size of ten several microns. Thereafter, said kaolin was heat treated in a Kanthal furnace at 800° C. for 2 hours to obtain a powder of metakaolin used in this invention. The main components of said metakaolin were silicon oxide ($SiO_2$) and aluminum oxide ($Al_2O_3$), and their contents were 56.1 wt % and 37.5 wt %, respectively. The powder of said metakaolin and the powder of the kaolin before heating were observed on an electron microscope to find that both powders were cylindrical. Further, when these two powders were analyzed using an X-ray diffractometer, it was confirmed that the kaolin before heating showed peak strength in a diffraction strength curve corresponding to the lattice planes (001), (020) and (002) of metahalloysite, while the metakaolin had lost the peak strength in the diffraction strength curve corresponding to the aforesaid diffraction lattice planes (001), (020) and (002) of metahalloysite, and thus was an amorphous substance.

Thereafter, the powder of said substance subjected to the aforesaid heating step and water glass (water glass No. 3; solid content 40 wt %) were charged into an alumina pot of a capacity of 300 cc, further 300 g of alumina balls of 15 mm in diameter were added, and mixed in a ball mill for 24 hours to obtain each inorganic material. At that time, the mixing amounts of the water glass and the metakaolin were 100 g of the water glass and the various amounts set forth in Table 1 of the metakaolin. Further, on mixing, the powder of said metakaolin was easily dissolved in the water glass. Thereafter, said inorganic materials were poured into plastic molds, dried and solidified at room temperature for 72 hours to obtain plate-formed inorganic materials of a size of 55 mm×25 mm and a thickness of 2 mm (Test Nos. 1–7; heating conditions: room temperature).

Further, separately, those similarly poured into the aforesaid molds were dried at room temperature for 24 hours and, using a crucible type nickel-chrome furnace, were subjected to drying by heating to the temperatures set forth in the same table at a temperature raising rate of 1.0° C./min and maintaining for 5 hours, to obtain inorganic material solidified products (Test Nos. 1–7; heating conditions: the temperatures set forth in Table 1 except room temperature).

Each obtained inorganic material solidified product was put into a beaker containing 100 ml of tap water, and, after leaving at 25° C. for 24 hours, its appearance and shape were examined to the naked eyes. The results are shown in Table 1. In the table, A represents that showing no change, while B represents that failing to retain its shape.

For comparison, from that containing 100 g of the metakaolin (C1) and that containing no metakaolin (C2), inorganic material solidified products were obtained by procedures similar to those described above. A water resistance test of said obtained solidified products was conducted by procedures similar to those described above. The obtained results are also shown in Table 1.

HCl. As a result, the amount of the $Na_2O$ dissolved was 3.3 wt % of the amount of the $Na_2O$ contained in said solidified film (coating).

For comparison, 30 g of the kaolin powder before heating and 100 g of the aforesaid water glass were mixed by procedures similar to those described above, the obtained inorganic material was coated on an aluminum plate, and dried at room temperature followed by drying by heating to obtain a solidified film. A hot water resistance test of said solidified film was conducted by procedures similar to those described above. As a result, the amount of $Na_2O$ dissolved was 4.7 wt %.

EXAMPLE 3

New Zealand kaolin ($SiO_2$: 49.3, $Al_2O_3$: 35.4) having a particle size of 200 microns or less was heat treated at 600° C. for 4 hours to obtain metakaolin ($SiO_2$ 57.9, $Al_2O_3$: 40.9) used in this invention. Said powder and the kaolin powder before heat treatment were analyzed using an X-ray diffractometer to confirm that the main component of the kaolin was metahalloysite while the powder obtained by heat treating said kaolin was an amorphous substance, that is, metakaolin.

Thereafter, 10 g of said metakaolin powder was added to and mixed with 100 g of Na type water glass

TABLE 1

| Test No. | Amount of Metakaolin Mixed (g) | Heating Conditions | | | | | | | | |
|---|---|---|---|---|---|---|---|---|---|---|
| | | Room Temp. | 80° C. | 120° C. | 150° C. | 180° C. | 240° C. | 340° C. | 500° C. | 600° C. |
| 1 | 5 | B | B | B | A | A | A | A | A | A |
| 2 | 15 | B | B | A | A | A | A | A | A | A |
| 3 | 20 | B | A | A | A | A | A | A | A | A |
| 4 | 30 | B | A | A | A | A | A | A | A | A |
| 5 | 40 | B | A | A | A | A | A | A | A | A |
| 6 | 60 | A | A | A | A | A | A | A | A | A |
| 7 | 80 | A | A | A | A | A | A | A | A | A |
| C1 | 100 | B | B | B | B | B | B | B | B | B |
| C2 | 0 | B | B | B | B | B | B | B | B | B |

EXAMPLE 2

Georgia kaolin ($SiO_2$: 46.9, $Al_2O_3$: 37.5) was ground to give a powder having a particle size of ten several microns or less, and said powder was heat treated at 600° C. for 5 hours to obtain a powder of metakaolin ($SiO_2$: 57.0, $Al_2O_3$: 40.6) used in this invention. Said powder and the kaolin powder before heating were analyzed using an X-ray diffractometer to confirm that the kaolin contained kaolinite as a main component, while the powder obtained by heat treating said kaolin was an amorphous substance, that is, metakaolin.

30 g of the powder of said metakaolin and 100 g of Na type water glass having a solid content of 40 wt % were mixed in a 300 cc alumina ball mill to obtain an inorganic material of this invention.

Said inorganic material was coated on an aluminum plate (dimensions: 150×60×1 mm) with a brush, dried and solidified at room temperature for 24 hours followed by further heating at 340° C. for an hour. The solidified film (coating) of the obtained inorganic material did not show expansion, and the adhesion to the aluminum plate was also good. Further, in order to examine the water resistance of said solidified film, the aluminum plate carrying said solidified film was dipped and left in 2 l of hot water for 2 hours, and its appearance and shape were examined to the naked eyes. As a result, no change was observed. Thereafter, the amount of $Na_2O$ dissolved into hot water was titrated using No. 3, and poured into a plastic container of an inner size of 60×30×5 mm, solidified at room temperature to obtain an inorganic material solidified product of 1 mm in thickness. Thereafter, said solidified product was sandwiched between two stainless steel plates of a size of 60×30×1 mm, placed vertically in the gravitational direction and subjected to heating at 340° C. in an electric oven for 2 hours. By this heat treatment, said solidified product was uniformly expanded to a thickness of 3 mm to obtain an expanded material having foams of about 0.8 mm in diameter. Said expanded material did not show any change in its appearance or shape even when dipped in hot water at 60° C. for 2 hours.

EXAMPLE 4

Kongo kaolin ($SiO_2$: 47.9, $Al_2O_3$: 35.8) of a particle size of about ten several microns was prepared, and when this kaolin was analyzed using an X-ray diffractometer, (001), (002), (003) and (004) planes of kaolinite were observed. The powder of said Kongo kaolin was heat treated at 900° C. for 10 minutes to obtain metakaolin ($SiO_2$: 53.8, $Al_2O_3$: 43.5).

20 g of said metakaolin powder was mixed with 100 g of water glass No. 3 having a solid content of 40 wt % to obtain an inorganic material of this invention, which was then put into a plastic container of a size of 60×60×5 mm, heated and dried in a heat drier at 80° C.

for 168 hours to obtain an inorganic material solidified product.

Thereafter, in order to examine the water resistance of said obtained solidified product, said solidified product was dipped and left in one liter of water (25° C.) for 24 hours. Thereafter, the shape and surface conditions of said solidified product were examined to the naked eyes, to find no change.

For comparison, using Kongo kaolin powder and water glass, an inorganic material solidified product was obtained by procedures similar to those described above, and a similar water resistance test was conducted. As a result, a comparative solidified product showed dissolution on the surface and failed to retain its shape.

EXAMPLE 5

Figure 2:
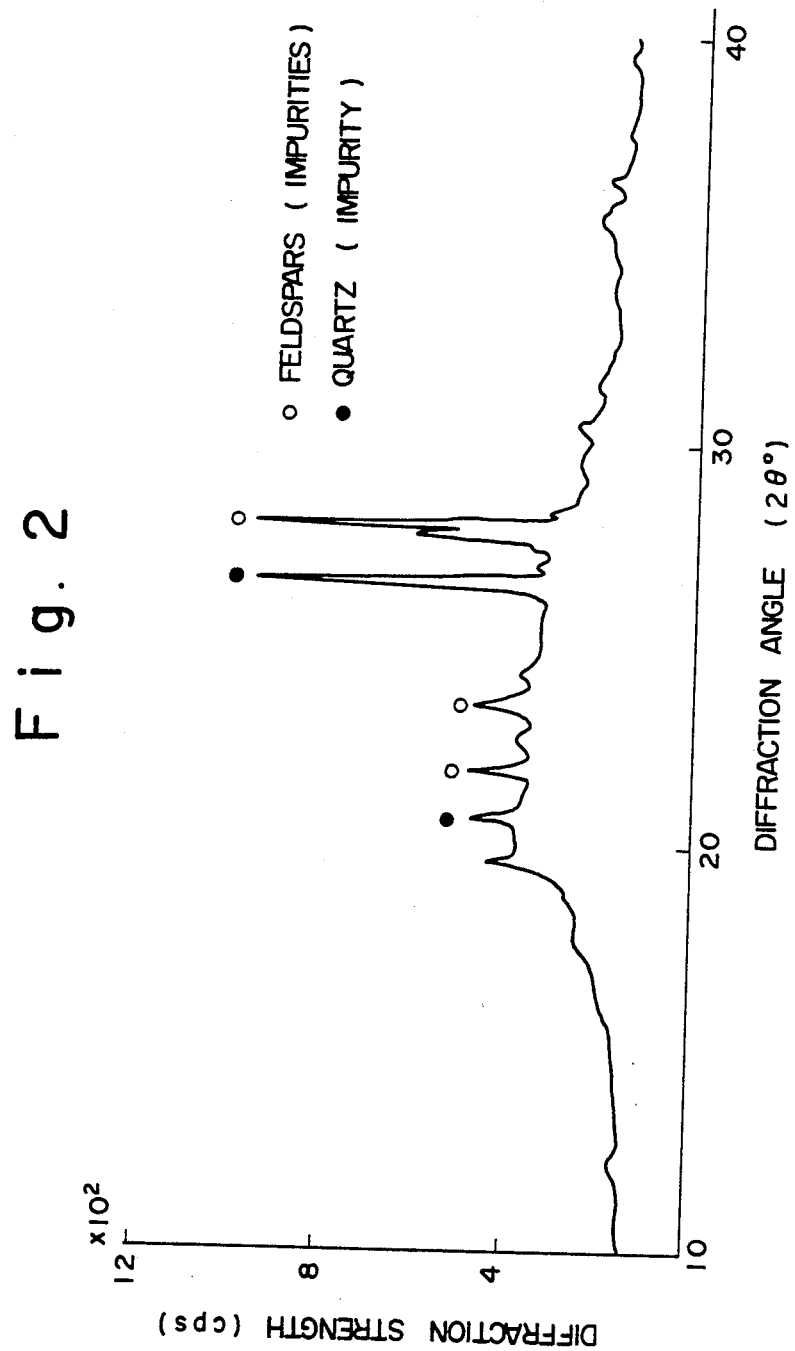
FIG. 2 is a graph showing an X-ray diffraction strength curve of metakaolin obtained by heat treating said kaolin.

Korea kaolin ($SiO_2$: 46.6, $Al_2O_3$: 34.8) was pulverized to obtain a kaolin powder passing a Japanese Industrial Standards sieve 145 mesh (105 μm). This was heat treated using a crucible type nickel-chrome furnace at 800° C. for 2 hours to obtain a metakaolin powder used in this invention. The main components of said metakaolin were silicon oxide ($SiO_2$) and aluminum oxide ($Al_2O_3$), and their contents were 55.7 wt % and 38.4 wt %, respectively. Said metakaolin powder and the kaolin powder before heating were subjected to a substance identification test by X-ray diffractometry using Cu-Kα-line. The results are shown in FIG. 1 as a diffraction strength curve of the kaolin powder and in FIG. 2 as a diffraction strength curve of the metakaolin powder. From these, it was confirmed that the metakaolin was different from the kaolin powder before heat treatment.

Thereafter, Turkey sepiolite was ground in a ball mill to particles of a particle size of ten several microns or less, thereby a sepiolite powder as said substance used in this invention was obtained. The main components of said powder were silicon oxide ($SiO_2$), magnesium oxide (MgO) and aluminum oxide ($Al_2O_3$), and their contents were 58.8 wt %, 23.2 wt % and 1.56 wt %, respectively.

Then, the metakaolin powder obtained by providing the above-described heating step, the spiolite powder, water glass (water glass No. 3, solid content 40%) and tap water were mixed in such proportions that based on 100 g of the water glass, the other substances were used in the amounts set forth in Table 2. Said mixtures were poured into aluminum molds, and dried and solidified at 25° C. for 168 hours to obtain inorganic material solidified products in a plate form of a size of 60×30×5 mm (Test Nos. 8–18).

The obtained inorganic material solidified products were each placed in a beaker containing 100 ml of tap water, left at 25° C. for 24 hours, and thereafter the appearance and shape were examined to the naked eyes. The results are shown in Table 2.

TABLE 2

| Test No. | Amounts Mixed (g) | | | | Water Resistance Test (Appearance & Shape) |
|---|---|---|---|---|---|
| | Meta-kaolin | Sepio-lite | Water | Kaolin | |
| 8 | 5 | 15 | 90 | — | No change |
| 9 | 5 | 80 | 740 | — | " |
| 10 | 10 | 10 | 40 | — | " |
| 11 | 10 | 60 | 540 | — | " |
| 12 | 20 | 5 | 0 | — | " |
| 13 | 20 | 80 | 740 | — | " |
| 14 | 40 | 5 | 0 | — | " |
| 15 | 40 | 40 | 740 | — | " |
| 16 | 60 | 10 | 40 | — | " |
| 17 | 80 | 5 | 0 | — | " |
| 18 | 80 | 80 | 1000 | — | " |
| C3 | 0 | 5 | 0 | 0 | Failed to retain its shape |
| C4 | 0 | 5 | 0 | 20 | Failed to retain its shape |
| C5 | 0 | 5 | 0 | 80 | Failed to retain its shape |
| C6 | 0 | 0 | 0 | 10 | Failed to retain its shape |
| C7 | 0 | 0 | 0 | 0 | Failed to retain its shape |
| C8 | 5 | 0 | 0 | 0 | Failed to retain its shape |
| C9 | 5 | 100 | 0 | 0 | Failed to retain its shape |
| C10 | 100 | 0 | 0 | 0 | Failed to retain its shape |
| C11 | 100 | 5 | 0 | 0 | Failed to retain its shape |
| C12 | 100 | 100 | 0 | 0 | Failed to retain its shape |

For comparison, inorganic material solidified products were obtained from materials in which metakaolin, sepiolite, water and heat treated kaolin were mixed in amounts set forth in Table 2 (C3–C12) per 100 g of the water glass, using procedures similar to those described above. Thereafter a water resistance test of the solidified products was conducted by procedures similar to those described above. The obtained results are also shown in Table 2.

EXAMPLE 6

New Zealand kaolin as in Example 3 was ground to obtain a powder of a particle size of ten several microns or less, and said powder was heat treated at 700° C. for 4 hours to obtain a metakaolin used in this invention. Said powder and the kaolin powder before heat treatment were analyzed using an X-ray diffractometer, to confirm that said kaolin mainly comprised metahalloysite and the powder obtained by heat treating said kaolin was an amorphous substance, that is, metakaolin.

Thereafter, Spain sepiolite ($SiO_2$: 58.4, MgO: 21.7, $Al_2O_3$: 1.98) was ground in a ball mill to particles of a particle size of ten several microns or less, whereby a sepiolite powder as said substance used in this invention was obtained.

Further, the metakaolin powder obtained by providing the above-described heating step, the sepiolite powder and water glass (water glass No. 3, solid content: 40 wt %) were mixed in a ball mill for 24 hours to obtain inorganic materials. The mixture contained, per 100 g of the water glass, metakaolin and sepiolite in amounts set forth in Table 3. On mixing, the metakaolin powder and the sepiolite powder were readily dissolved in the water glass. Thereafter, said inorganic materials were poured into plastic molds, then dried at room temperature for 24 hours, and further dried by using a crucible type nickelchrome furnace by raising the temperature to the temperature shown in Table 3 under "Heating Temperature" at a heating rate of 1.0° C. /min. and maintaining for 5 hours to obtain inorganic material solidified products (Test Nos. 19–34).

Each obtained inorganic material solidified product was tested for water resistance and hot water resistance. First, a water resistance test was conducted by putting said solidified product into a beaker containing 100 ml of tap water, then leaving at 25° C. for 24 hours and examining its appearance and shape to the naked eyes. A hot water resistance test was conducted by dipping and leaving said solidified product in hot water at 60° C. for 2 hours, and examining its appearance and shape to the naked eyes. The obtained results are shown in Table 3.

For comparison, those in which the amounts of the metakaolin and sepiolite mixed were as shown in Table 3 were treated by procedures similar to those described above to obtain inorganic material solidified products (Test Nos. C13–C16). Said solidified products thus obtained were tested for water resistance and hot water resistance. The obtained results are shown in Table 3.

TABLE 3

| Test No. | Amounts Mixed (g) Meta-kaolin | Sepio-lite | Heating Temperature | Water Resistance Test | Hot Water Resistance Test |
|---|---|---|---|---|---|
| 19 | 5 | 60 | 80 | No change | No change |
| 20 | 5 | 60 | 120 | " | " |
| 21 | 5 | 60 | 180 | " | " |
| 22 | 5 | 60 | 240 | " | " |
| 23 | 5 | 60 | 360 | " | " |
| 24 | 5 | 60 | 500 | " | " |
| 25 | 60 | 5 | 80 | " | " |
| 26 | 60 | 5 | 120 | " | " |
| 27 | 60 | 5 | 180 | " | " |
| 28 | 60 | 5 | 240 | " | " |
| 29 | 60 | 5 | 360 | " | " |
| 30 | 60 | 5 | 500 | " | " |
| 31 | 40 | 40 | 80 | " | " |
| 32 | 40 | 40 | 180 | " | " |
| 33 | 40 | 40 | 360 | " | " |
| 34 | 40 | 40 | 500 | " | " |
| C13 | 5 | 60 | 40 | " | Failed to retain its shape |
| C14 | 60 | 5 | 40 | " | Failed to retain its shape |
| C15 | 0 | 5 | 80 | " | Failed to retain its shape |
| C16 | 0 | 10 | 40 | Failed to retain its shape | Failed to retain its shape |

EXAMPLE 7

An inorganic material of this invention was produced from the composition of Test No. 10 in Example 5, 10 g thereof was poured into a plastic container of inner dimensions of 60×60×5 mm, dried and solidified at 25° C. for 24 hours, then taken from the container, and further heat treated at 80° C. for 24 hours to obtain an inorganic material solidified product. Said solidified product had been shrinked in size by about 12% by the drying and heat treating steps. For comparison, a comparative inorganic material solidified product was obtained from the composition of Test No. C3 in Example 5 by procedures similar to those described above. Said solidified products were separately put into beakers containing 100 ml of hot water at 60° C., left in a constant temperature chamber at 60° C. for 3 hours, and each appearance was observed, to find that the comparative inorganic material solidified product failed to retain its shape, whereas the product of this invention showed no change in shape.

EXAMPLE 8

A Georgia kaolin powder (SiO$_2$: 46.9, Al$_2$O$_3$: 37.5) having a particle size in the range of 60–100 mesh was heated in a crucible type nickel-chrome furnace at 600° C. for 10 hours to obtain a metakaolin powder used in this invention. Thereafter, 100 g of water glass No. 3 having a solids content of 40 wt % was mixed with 5 g of the aforesaid metakaolin powder and 5 g of America attapulgite (SiO$_2$: 57.1, MgO: 9.8, Al$_2$O$_3$: 12.2) to obtain an inorganic material of this invention. Said inorganic material was poured into a plastic container having inner dimensions of 60×30×5 mm, and solidified at normal temperature to obtain an inorganic material solidified product of 1 mm in thickness. Said solidified product was sandwiched with stainless steel plates of a size of 60×30×1 mm, placed vertically in the gravitational direction in an electric oven, and subjected to heat treatment by maintaining at 340° C. for 5 hours. By this heat treatment, said solidified product was uniformly expanded to 6 mm in thickness, whereby an expanded material having foams of about 1 mm in diameter was obtained.

For comparison, a comparative inorganic material at a mixing rate of 10 g of the metakaolin per 100 g of the water glass was produced, and by procedures similar to those described above, an expanded material was obtained.

The above two expanded materials were dipped in hot water at 60° C. for 2 hours, and the amount of Na$_2$O dissolved into hot water (wt %) was titrated with 0.1N hydrochloric acid, to find that the amount for the comparative expanded material was 12%, while that for the product of this invention was 3.4%.

EXAMPLE 9

To the inorganic material of this invention having the composition of Example 7 was added an alumina powder of a particle size of 60–100 counts in an amount of 20 g per 100 g of the water glass. Thereafter, this inorganic material was dried at room temperature for 48 hours in a manner similar to that in Example 7 and thereafter solidified at a temperature of 180° C. for 5 hours to obtain an inorganic material solidified product of this invention. Said solidified product showed a shrinkage of about 3% in size by the drying and heat treating steps. In order to examine the hot water resistance of said solidified product, said solidified product was dipped in hot water at 60° C. for 2 hours, and the amount of Na$_2$O dissolved (wt %) was measured. As a result, the amount of Na$_2$O dissolved was 13 wt % of the Na$_2$O contained in said solidified product.

On the other hand, the inorganic material of this invention having the composition of Example 6 and, as a comparison, a comparative inorganic material at a mixing proportion of 10 g of the metakaolin per 100 g of water glass No. 3 were respectively dried at room temperature for 48 hours in a manner similar to that in Example 7, and thereafter solidified at 180° C. for 5 hours to obtain an inorganic material solidified product of this invention and a comparative solidified product. Both of these two solidified products showed a shrinkage of about 12% in size by the drying and heat treating steps. Further, when said two solidified products were dipped in hot water at 60° C. for 2 hours and the amount of Na$_2$O dissolved (wt %) was measured, the amount of Na$_2$O dissolved (wt %) from the inorganic material solidified product of this invention was 13 wt %, while that from the comparative solidified product was 78 wt %.

EXAMPLE 10

An inorganic material of this invention was produced using a composition similar to that of Test No. 8 in Example 5, said inorganic material was coated on a separately prepared aluminum square bar (size: 12.5×12.5×30 mm), which was in turn bonded to another similar square bar head to head. Thereafter, this was left at normal temperature for 2 hours, dried at 340° C. for 20 minutes to solidify, thereby an aluminum square bar bonded with said inorganic material was obtained. In order to examine the hot water resistance of the joint part of said aluminum square bar, said square bar was left in 300 ml of boiling water for an hour and removed. Said joint part did not show any change in appearance.

EXAMPLE 11

Twenty g of a metakaolin powder obtained by heating a Georgia kaolin powder having a particle size in the range of 60-100 mesh, 10 g of America attapulgite (60-100 mesh), 100 g of water glass No. 3 and 40 g of tap water were mixed to obtain an inorganic material of this invention. Ten g of said inorganic material was poured into a plastic container of inner dimensions of 60×30×10 mm, and dried and solidified at 25° C. for 36 hours to obtain an inorganic material solidified product, which was then removed therefrom, put into a porcelain crucible, heated in a crucible type nickel-chrome furnace to 500° C. at a rate of 200° C. per hour and dried at 500° C. for 5 hours to obtain an inorganic material solidified product. In order to examine the boiling water resistance of said solidified product, this was dipped in 500 ml of boiling water for 2 hours. As a result, there was no change in appearance and shape, and further said solidified product after dipping was a solidified product giving "metallic" sounds when tapped.

EXAMPLE 12

An inorganic material of this invention was produced using the composition of Test No. 12 of Example 5. Ten g thereof was poured into a plastic container of inner dimensions of 60×60×5 mm, dried to solidify at 25° C. for 24 hours, then removed from said plastic container, and further heat treated at 180° C. for 5 hours to obtain an inorganic material solidified product.

For comparison, a comparative inorganic material solidified product was obtained from the composition of Comparative Example Test No. C4 of Example 5 by procedures similar to those described above. When the amount of $Na_2O$ dissolved (wt %) into hot water when dipped in hot water at 60° C. for 2 hours was titrated with 0.1N hydrochloric acid, it was 9 wt % for the product of this invention, whereas it was 50 wt % for the comparative product.

What is claimed is:

1. Inorganic material having high water resistance when solidified, which comprises a mixture of water glass and metakaolin obtained by heat treating a kaolin group clay mineral selected from the group consisting of kaolinite, dickite, narcrite, metahalloysite, halloysite and mixtures thereof at a temperature ranging from 600° to 900° C.

2. Inorganic material according to claim 1, wherein said mixture further contains a hydrous magnesium silicate type clay mineral.

3. Inorganic material according to claim 2, wherein said hydrous magnesium silicate type clay mineral is selected from sepiolite, xylotile, palygorskite and loughlinite.

4. A process for producing inorganic material comprising heat treating at a temperature ranging from 600° to 900° C. a kaolin group clay mineral selected from the group consisting of kaolinite, dickite, nacrite, metahalloysite, halloysite and mixtures thereof to obtain metakaolin,
mixing said metakaolin and water glass,
thereby producing inorganic material having high water resistance when solidified.

5. A process according to claim 4, wherein said metakaolin is mixed in an amount ranging from 12.5 to 200 g on a dry weight basis per 100 g of a solid content of said water glass.

6. A process according to claim 4, wherein a hydrous magnesium silicate type clay mineral is further mixed in the mixing step.

7. A process according to claim 6, wherein said hydrous magnesium silicate type clay mineral is selected from sepiolite, xylotile, palygorskite and loughlinite.

8. A process according to claim 6, wherein each of said metakaolin and hydrous magnesium silicate type clay mineral is mixed in an amount ranging from 12.5 to 200 g on a dry weight basis per 100 g of a solid content of said water glass.

9. A method for solidifying inorganic material comprising heating at a temperature ranging from 600° to 900° C. a kaolin group clay mineral selected from the group consisting of kaolinite, dickite, nacrite, metahalloysite, halloysite and mixtures thereof to obtain metakaolin,
mixing said metakaolin and water glass to produce inorganic material, and
heating said inorganic material to a temperature ranging from 80° to 500° C., thereby providing solidified inorganic material having high water and hot water resistances.

10. A method according to claim 9, wherein said metakaolin a mixed on an amount ranging from 12.5 to 200 g on a dry weight basis per 100 g of a solid content of said water glass.

11. A method according to claim 9, wherein a hydrous magnesium silicate type clay mineral is further mixed in the mixing step.

12. A method according to claim 11, wherein said hydrous magnesium silicate type clay mineral is selected from sepiolite, xylotile, palygorskite and loughlinite.

13. A method according to claim 11, wherein each of said metakaolin and hydrous magnesium silicate type clay mineral is mixed in an amount ranging from 12.5 to 200 g on a dry weight basis per 100 g of a solid content of said water glass.

* * * * *